United States Patent Office 2,860,033
Patented Nov. 11, 1958

2,860,033

METHOD OF MAKING GRANULAR SODIUM METASILICATE

Isadore Mockrin, Philadelphia, Ford R. Lowdermilk, Gwynedd Valley, and Clair Warren Graver, Chestnut Hill, Pa., assignors to Pennsalt Chemicals Corporation, a corporation of Pennsylvania No Drawing. Application January 28, 1955
Serial No. 484,814

1 Claim. (Cl. 23—110)

The present invention relates to the production of sodium metasilicate in granular form and more particularly to the treatment of crystalline or finely-divided anhydrous sodium metasilicate to produce a granular product and to the product thus produced.

Anhydrous sodium metasilicate, particularly when produced by the processes described in co-pending applications Ser. Nos. 433,041, filed May 28, 1954, now Patent No. 2,798,399, and Ser. No. 484,813, filed January 28, 1955, is frequently in a finely-divided state. When the finely-divided anhydrous sodium metasilicate is blended with other materials, such as phosphates, caustic soda, sodium carbonate, etc., which are usually present in granular form, the finely-divided anhydrous sodium metasilicate tends to segregate. For these and other reasons, it is frequently desirable to have the sodium metasilicate in a granular form.

It has now been discovered that finely-divided anhydrous sodium metasilicate can be converted into a granular non-dusting sodium silicate product, which can be readily blended with other materials, if a controlled amount of water is added to the finely-divided anhydrous sodium metasilicate. The addition of the water converts the anhydrous sodium metasilicate into a granular form. This granular product, on analysis, appears to be made up of an intimate mixture of anhydrous sodium metasilicate and sodium metasilicate hexahydrate. The product has a water content of about 1.3 to 2.8 mols water per mol of sodium metasilicate.

If any substantial amount of caustic soda is present in the anhydrous sodium metasilicate, the addition of water will fail to give the granular product referred to. It is, therefore, necessary when preparing granular metasilicate from anhydrous sodium metasilicate prepared in accordance with the process described in application Ser. No. 484,813 wherein anhydrous sodium metasilicate is crystallized from an alkaline sodium silicate solution, to first wash the precipitated anhydrous sodium metasilicate. This is preferably done by washing with an aqueous solution of sodium metasilicate. If the precipitated crystals are not thus washed, prior to the granulation step, a granular product may not result or the granules, if formed, generally will not have good mechanical strength.

In practicing the present invention the water is added to the finely-divided anhydrous sodium metasilicate while blending. The amount of water added is in the range of about 2 to 4 parts by weight water per 10 parts by weight of the anhydrous sodium metasilicate treated. If the water is added too slowly a powdered product with little or no granulation may result. However, if the water is added rapidly, for example, at a rate of about 0.11 to 0.17 part of water per part anhydrous sodium metasilicate per minute, a granular product is obtained. More rapid addition will not prevent granulation. Where the sodium metasilicate is obtained by the process of application Ser. No. 433,031, filed May 28, 1954, the water should be added at a rate of at least 0.03 part $H_2O$ per part $Na_2SiO_3$ per min. When the water is added at the correct rate to the anhydrous sodium metasilicate powder, the mixture suddenly becomes translucent, some caking occurring at the same time. This translucent appearance can in some cases be used as an "endpoint" in the water addition. After the water addition, blending is continued until a uniform product is obtained, blending generally being continued for about ¼ to ½ hour.

The following examples will help to better illustrate the practice of the present invention:

Example 1

350 parts by weight of a sodium metasilicate powder, prepared by the catalyzed sodium carbonate, silicon dioxide process described in co-pending application Ser. No. 433,041 were placed in a sigma arm mixer. 115 parts by weight of water were then added to the sodium metasilicate powder while it was being agitated. The water was added in from 2 to 3 minutes. The metasilicate powder with the water were than blended for another 10 minutes in the mixer and then removed to a tumbling barrel in which they were tumbled for another 15 minutes.

The resulting product was found to contain on analysis 2.3 mols of water per mol of sodium metasilicate and had the following screen analysis:

| Mesh size: | Weight percent |
|---|---|
| +4 | 29 |
| −4 +20 | 45 |
| −20 +42 | 19 |
| −42 | 7 |
| | 100 |

The product was dust free and could be crushed to smaller size without the formation of excessive fines. For example, part of the −4 +20 fraction was ball milled, and the milled product divided into 2 fractions. One fraction consisted of 65% of the ball milled product, and had a mesh size of −20 +40. The other fraction, which consisted of 35% by weight of the product, had a mesh size of −42. Neither fraction dusted.

Example 2

400 parts by weight of washed anhydrous sodium metasilicate prepared by the process of co-pending application Ser. No. 484,813 were placed in a sigma arm mixed. While the mixer was being operated, 117 grams of water were added rapidly, the addition of the water taking about 2 minutes. After a mixing period of about 4 minutes the mass appeared too "wet" so an additional 20 parts by weight of the washed anhydrous sodium metasilicate were added, the blending being continued. After about 5 minutes' further blending, after the addition of the 20 parts by weight anhydrous sodium metasilicate, a product composed of hard individual granules was obtained. The total lapse of time in the production of the granular product from the start of water addition was only 12 minutes. The product had a calculated empirical composition, based on the water content determined, of $Na_2SiO_3 \cdot 1.9H_2O$.

The products obtained by the present invention are dustless, hard pellets readily soluble in water. As previously stated, the granular pellets are composed of an intimate mixture of anhydrous sodium metasilicate and sodium metasilicate hexahydrate. There is, however, the possibility that some sodium metasilicate pentahydrate may also be present. These are generally present in the amounts of 66 to 38% of the anhydrous salt and 34 to 62% of the hexahydrate. The water content of the granular mixture is generally in the order of 1.3 to 2.8 mols water per mol of sodium metasilicate. The granules have a melting range of approximately 63° to 70° C. The granular product can be stored in sealed containers for substantial periods of time without any appreciable caking, and is ideal for blending with other materials in the formation of detergent compositions.

If an anhydrous granular product is desired rather than the granular intimate mixture of anhydrous sodium metasilicate and sodium metasilicate hexahydrate, a substantially anhydrous product can be obtained by heating the product of the present invention, preferably under vacuum, to drive off the water of crystallization contained therein. Practically all of the water can be driven off at temperatures as low as 150° C., it generally requiring about 1 to 2 hours at a temperature of approximately 150° C. to give a substantially anhydrous granular product.

A substantially anhydrous product can also be obtained by the process of co-pending application Ser. No. 484,815, filed January 28, 1955, by blending the granular product of the present invention with finely-divided anhydrous sodium metasilicate at a temperature between the melting temperature of sodium metasilicate hexahydrate and the melting temperature of the anhydrous sodium metasilicate.

Having thus described our invention, we claim:

The method of making a granular sodium metasilicate product comprising adding water, at a rate of at least 0.03 part of water per part of anhydrous sodium metasilicate per minute, to finely-divided anhydrous sodium metasilicate while blending until the mixture acquires a translucent appearance, discontinuing the addition of further water and continuing blending for at least twelve minutes until the product has a uniform appearance.

References Cited in the file of this patent

UNITED STATES PATENTS

| | | |
|---|---|---|
| 2,161,515 | Jaeger et al. | June 6, 1939 |
| 2,282,018 | Baker | May 5, 1942 |
| 2,593,652 | Blanchard | Apr. 22, 1952 |

FOREIGN PATENTS

| | | |
|---|---|---|
| 868,962 | France | Oct. 20, 1941 |

OTHER REFERENCES

Merrill: "Chemistry of the Soluble Silicates," Journal of Chemical Education, June 1947, pages 262–269.

Vail: "Soluble Silicates" (1952), Reinhold Publ. Co., New York city, page 138.